(12) United States Patent
Lindholm et al.

(10) Patent No.: US 12,454,241 B1
(45) Date of Patent: Oct. 28, 2025

(54) DETACHABLE SEAT AIRBAG COVER

(71) Applicant: Volvo Car Corporation, Gothenburg (SE)

(72) Inventors: Johannes Lindholm, Gothenburg (SE); Jonathan Viktorsson, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/737,533

(22) Filed: Jun. 7, 2024

(51) Int. Cl.
*B60R 21/2165* (2011.01)
*B60R 21/207* (2006.01)

(52) U.S. Cl.
CPC ........ *B60R 21/2165* (2013.01); *B60R 21/207* (2013.01); *B60R 2021/2076* (2013.01)

(58) Field of Classification Search
CPC .............. B60R 21/2165; B60R 21/207; B60R 2021/2076
See application file for complete search history.

(56) References Cited

U.S. PATENT DOCUMENTS 7,954,842 B2 * 6/2011 Deppe ................... B60R 21/201
280/730.2

FOREIGN PATENT DOCUMENTS

| EP | 1193118 A2 * | 4/2002 | ............... B60N 2/60 |
| FR | 2772699 A1 * | 6/1999 | ........... B60N 2/4415 |
| JP | 2002002344 A * | 1/2002 | |
| WO | WO-2009014094 A1 * | 1/2009 | ............. A44B 19/06 |

* cited by examiner

*Primary Examiner* — Faye M Fleming
(74) *Attorney, Agent, or Firm* — Amin, Turocy & Watson, LLP

(57) ABSTRACT

Various systems and methods are presented regarding implementing a detachable cover over an airbag located in a seat, wherein the airbag is deployed during impact testing to determine operation of the airbag when deployed/installed in a vehicle. The detachable cover can be attached/detached from the seat by a zipper(s), button(s), and any other suitable attachment means. The detachable cover further includes a connection means configured to connect respective portions/segments of the detachable cover, and further, the connection means is configured to fail/rupture during deployment of the airbag.

20 Claims, 10 Drawing Sheets

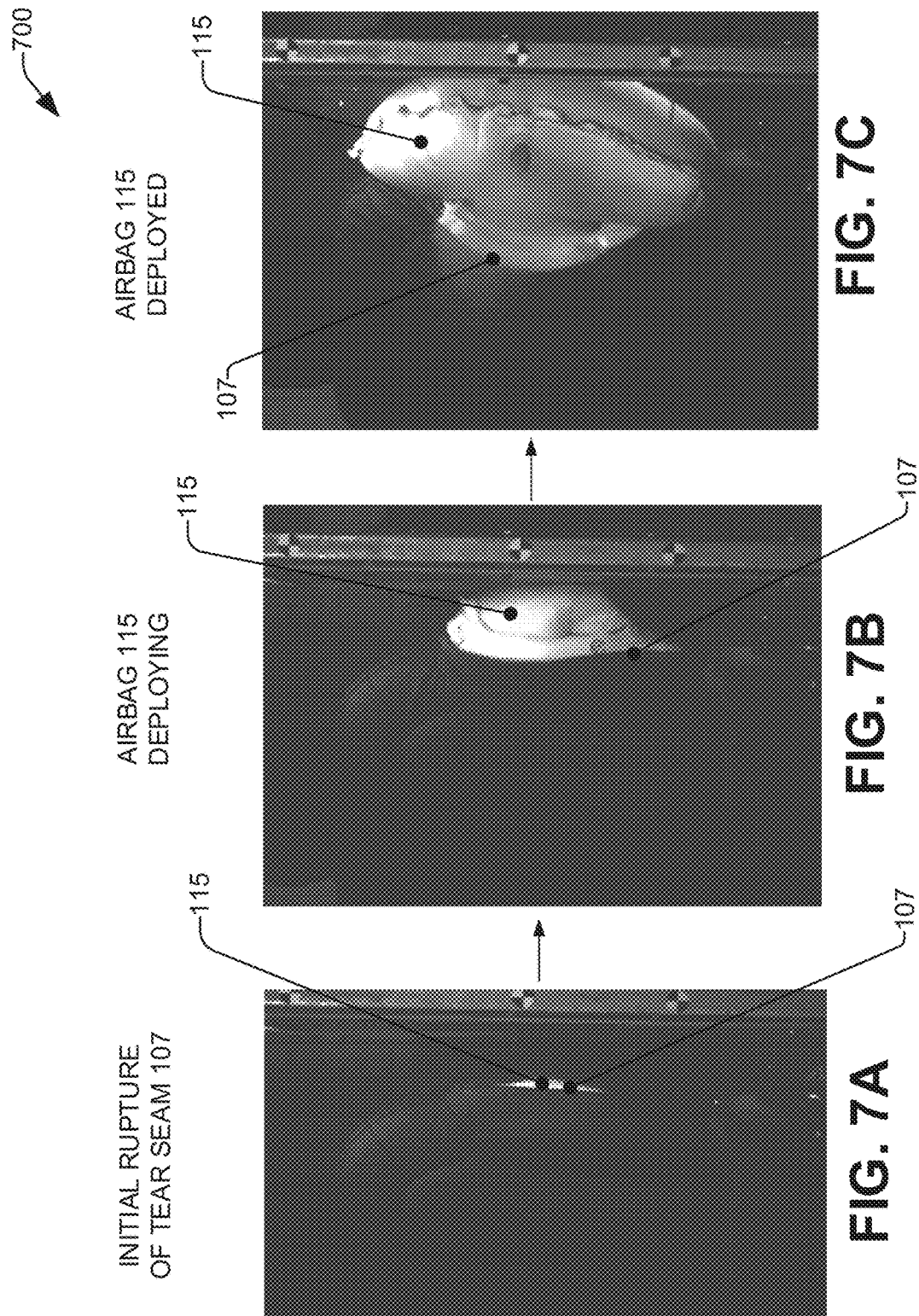

DETACHABLE SEAT AIRBAG COVER

TECHNICAL FIELD

This application relates to systems and techniques for deploying an airbag during testing of a seat configured for an automative application.

BACKGROUND

Development of airbags for automotive applications requires physical testing, which can be resource intensive regarding time, cost, materials, emissions, and such. Airbags are sourced from multiple product vendors, and accordingly, all have to be tested/assessed to confirm desired operation. During design of a new vehicle platform, potentially hundreds of airbags are tested. In a particular application, airbags can be incorporated into a seat and tested, which can result in a considerable cost and material waste.

Airbags are typically integrated into the vehicle interior, and upon deployment, the airbag ruptures/breaks the protective/aesthetic covering. For airbags incorporated into a seat (e.g., seat side airbag, seat far-side airbag, pelvic restraint cushion, and suchlike), deployment of an airbag is achieved by the airbag rupturing a tear seam and deploying via the created opening. A tear seam is a weakened seam in the seat upholstery designed to rupture/break/fail in response to application of the force of the airbag expanding during deployment. Owing to the tear seam rupturing, a portion of the seat and seat upholstery is destroyed during testing, which is costly and wasteful given a new seat is utilized for each test, as complete but damaged seats are scrapped almost directly after production.

In early development phases, seats are expensive, potentially costing many times more than the cost of the finally designed/production seat. Further, with vehicle design/development/production being conducted at multiple locations across the globe, further issues arise regarding shipping/transportation, cost, time, carbon/emissions, and suchlike, regarding the seat tests.

The above-described background is merely intended to provide a contextual overview of some current issues and is not intended to be exhaustive. Other contextual information may become further apparent upon review of the following detailed description.

Summary

The following presents a summary to provide a basic understanding of one or more embodiments described herein. This summary is not intended to identify key or critical elements, or delineate any scope of the different embodiments and/or any scope of the claims. The sole purpose of the summary is to present some concepts in a simplified form as a prelude to the more detailed description presented herein.

In one or more embodiments described herein, systems, devices, methods, and/or apparatus are presented fabricate and attach a detachable cover to a vehicle seat, wherein the detachable cover is positioned over an airbag for deployment testing of the airbag during impact testing of the vehicle seat and/or vehicle in which the vehicle seat is located.

The one or more embodiments described herein present a detachable cover comprising a first segment and a second segment, wherein the first segment and the second segment are attached by a connection means.

In an embodiment, the first segment can comprise a first material having at least two edges, wherein a first edge of the first segment is located opposite to a second edge of the first segment, and the first edge of the first segment has a first portion of a first attachment means attached to thereto. In another embodiment, the second segment can comprise a second material having at least two edges, wherein a first edge of the second segment is located opposite to a second edge of the second segment, and the first edge of the second segment has a first portion of a second attachment means attached to thereto. In a further embodiment, the second edge of the first segment is located adjacent to the second edge of the second segment, and the connection means attaches the second edge of the first segment to the second edge of the second segment.

In an embodiment, the first material and the second material comprise at least one of a fabric, leather, artificial leather, a manmade material, a polymer, carbon fiber, a woven material, a textile.

In another embodiment, the first segment and second segment are substantially rectangular in shape.

In a further embodiment, the detachable cover is configured to attach to a seat, and further cover an opening for an airbag incorporated into the seat.

In another embodiment, the connection means can be configured to fail preferentially relative to the first attachment means and the second attachment means. In a further embodiment, the connection means can be configured to fail in response to pressure applied to the connection means during deployment of the airbag. In another embodiment, the connection means can be configured to fail at a pressure equal to, or less than, the pressure applied by the airbag.

In a further embodiment, the first attachment means and the second attachment means can comprise one of a zip, a zipper, VELCROC, a hook and loop strip, at least one hook, at least one button, at least one magnet, an adhesive, a cable tie, a zip tie, a means for attaching two surfaces together, or a combination thereof.

In another embodiment, the first portion of the first attachment means can be configured to attach the detachable cover to a second portion of the first attachment means, the second portion of the first attachment means is located on a seat, and the first portion of the second attachment means can be configured to attach the detachable cover to a second portion of the second attachment means, the second portion of the first attachment means is located on the seat. In a further embodiment, a distance D between the second portion of the first attachment means and the second portion of the second attachment means is substantially equal to a first width W1 between the first edge of the first segment and the second edge of the first segment and a second width W2 between the first edge of the second segment and the second edge of the second segment.

In an embodiment, the connection means can be one of a thread, a fiber, a yarn, or a filament, and the connection means comprises natural or synthetic material. In another embodiment, application of the connection means forms a flat seam adjoining the first edge of the first segment to the first edge of the second segment.

In other embodiment, elements described in connection with the disclosed systems can be embodied in different forms such as a method. For example, in an embodiment, a method can be utilized to fabricate a first segment of a detachable cover, wherein a first edge of the first segment is attached to a first attachment means. In a further embodiment, method can further comprise fabricating a second segment of the detachable cover, wherein a first edge of the second segment is attached to second attachment means, further attaching a second edge of the first segment to a second edge of the second segment, wherein a connection means is utilized to attach the second edge of the first segment to the second edge of the second segment, and further attaching the detachable cover to a seat, wherein the seat has an airbag incorporated therein.

In an embodiment, attachment can be via the first portion of the first attachment means connects with a second portion of the first attachment means, the second portion of the first attachment means is fixed to the seat, and attachment is further via the first portion of the second attachment means connects with a second portion of the second attachment means, the second portion of the second attachment means is fixed to the seat. In an embodiment, the second portion of the first attachment means and the second portion of the second attachment means can be located about an opening in the seat, the airbag is located in the opening, and deployment of the airbag causes breakage of the connection means connecting the first segment to the second segment.

According to further embodiments, a system is provided comprising a seat having an opening incorporated into an exterior surface of the seat and an airbag incorporated into the seat, wherein the opening facilitates deployment of the airbag from within the seat. The system can further comprise a first attachment means located on the exterior surface on a first side of the opening and a second attachment means located the exterior surface on a second side of the opening. The system can further comprise a detachable cover located over the opening and further comprising a third attachment means attached to the first attachment means, and a fourth attachment means attached to the second attachment means, wherein the detachable cover includes a tear seam configured to rupture during deployment of the airbag.

DESCRIPTION OF THE DRAWINGS

One or more embodiments are described below in the Detailed Description section with reference to the following drawings.

FIGS. 7A-C illustrates testing of an airbag, wherein the airbag is incorporated into a seat.

DETAILED DESCRIPTION

The following detailed description is merely illustrative and is not intended to limit embodiments and/or application or uses of embodiments. Furthermore, there is no intention to be bound by any expressed and/or implied information presented in any of the preceding Background section, Summary section, Abstract, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As used herein, "data" can comprise metadata. Further, ranges A-n are utilized herein to indicate a respective plurality of devices, components, signals etc., where n is any positive integer.

As previously mentioned, safety testing of vehicles and incorporated components can be a costly and materially wasteful endeavour. The various embodiments presented herein disclose a detachable cover which can be securely located over/at the region of the airbag prior to testing, while during testing, the detachable cover undergoes failure comparable to the failure mechanism of the failure seam of the conventional test seat. The various embodiments presented herein reduce material waste (e.g., reduced number of seats destroyed) while improving cost effectiveness of testing and sustainability with regard to the reduction in waste. The various embodiments presented herein have the same airbag breakthrough characteristics of a conventional test apparatus, without influencing the airbag test conditions, and further, do not overly interfere with the foam geometry of the seat, location of the airbag within the seat, and further, do not interfere with operation of a test dummy during airbag/seat testing.

Figure 6:
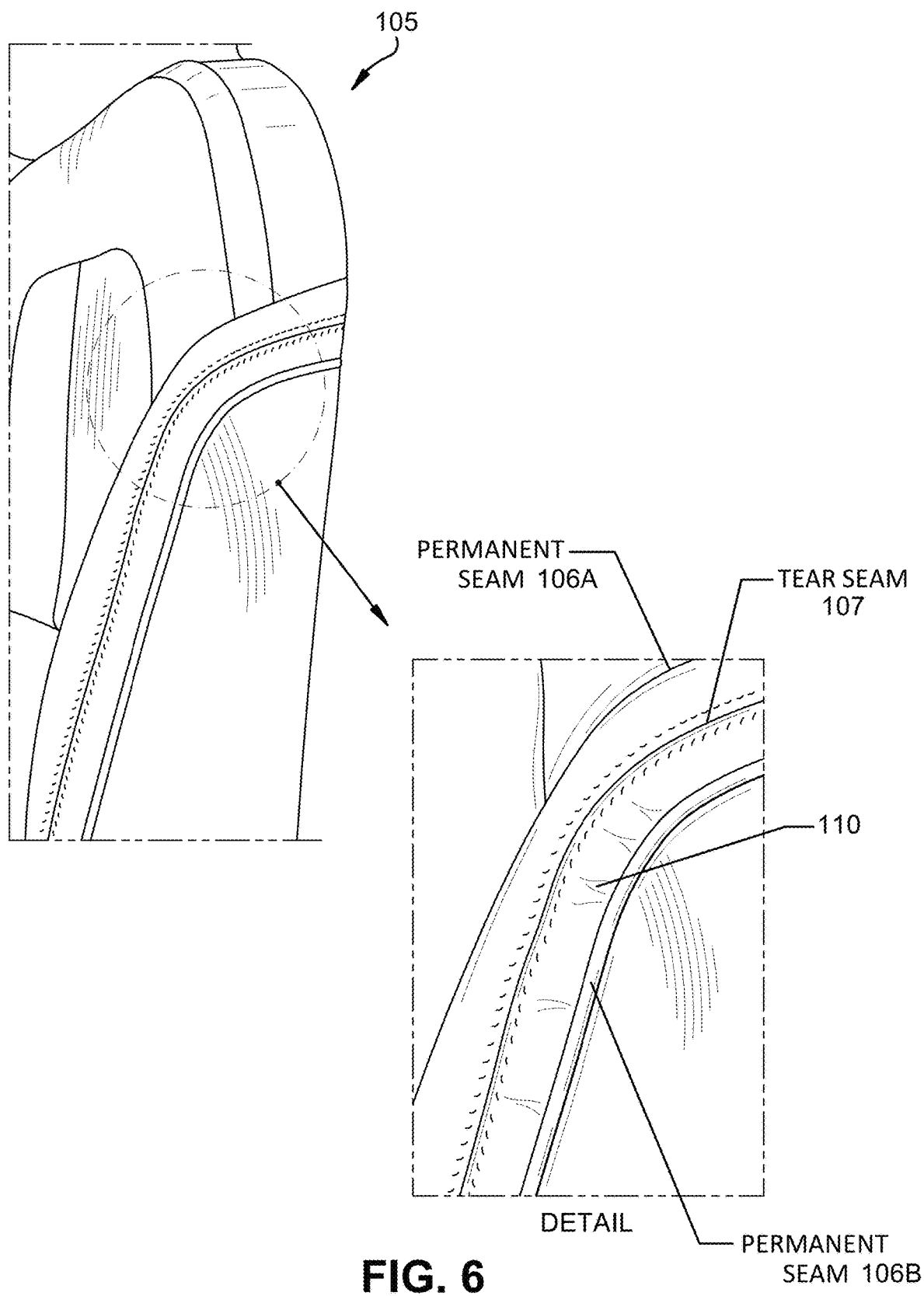
FIG. 6 illustrates a conventional seat airbag test apparatus comprising a tear seam with an airbag incorporated into the seat beneath the tear seam.

For context of the various embodiments presented herein, FIG. 6 presents images illustrating location of a tear seam 107 incorporated into a seat 105, wherein the tear scam 107 is configured to fail during testing of a conventional test seat 105 with an incorporated airbag 115, FIG. 7A-C presents images of an airbag deploying during testing. Airbag 115 can be attached to an internal structure (not shown) of the seat 105, such that the airbag 115 is located in a cavity formed in the foam padding (or other seat material). As shown in FIGS. 6 and 7A-C, deployment of the airbag 115 causes the tear seam 107 (and similarly connection means 150, as further described) to rupture and the airbag 115 emerges through the gap resulting from the ruptured tear seam 107. Rupture of the tear seam 107 results from pressure P inflating the airbag 115, such that the team seam 107 is configured to rupture during application of pressure P during deployment of airbag 115. Per FIGS. 6 and 7A-C, the permanent seams 106A-n joining the fabric/material of the exterior surface 110 of the seat 105 are configured to not fail during deployment of the airbag 115, hence, the tear seam 107 (and connection means 150, as further described) is configured to fail preferentially over the material utilized to fabricate the permanent scams 106A-n.

It is to be appreciated that while the various embodiments presented herein relate to a detachable cover for testing of an airbag located in a seat deigned for automotive applications, the various embodiments are not so limited and can be equally applied to any application that undergoes destructive testing involving integrated airbags and the deployment thereof.

Figure 1A:
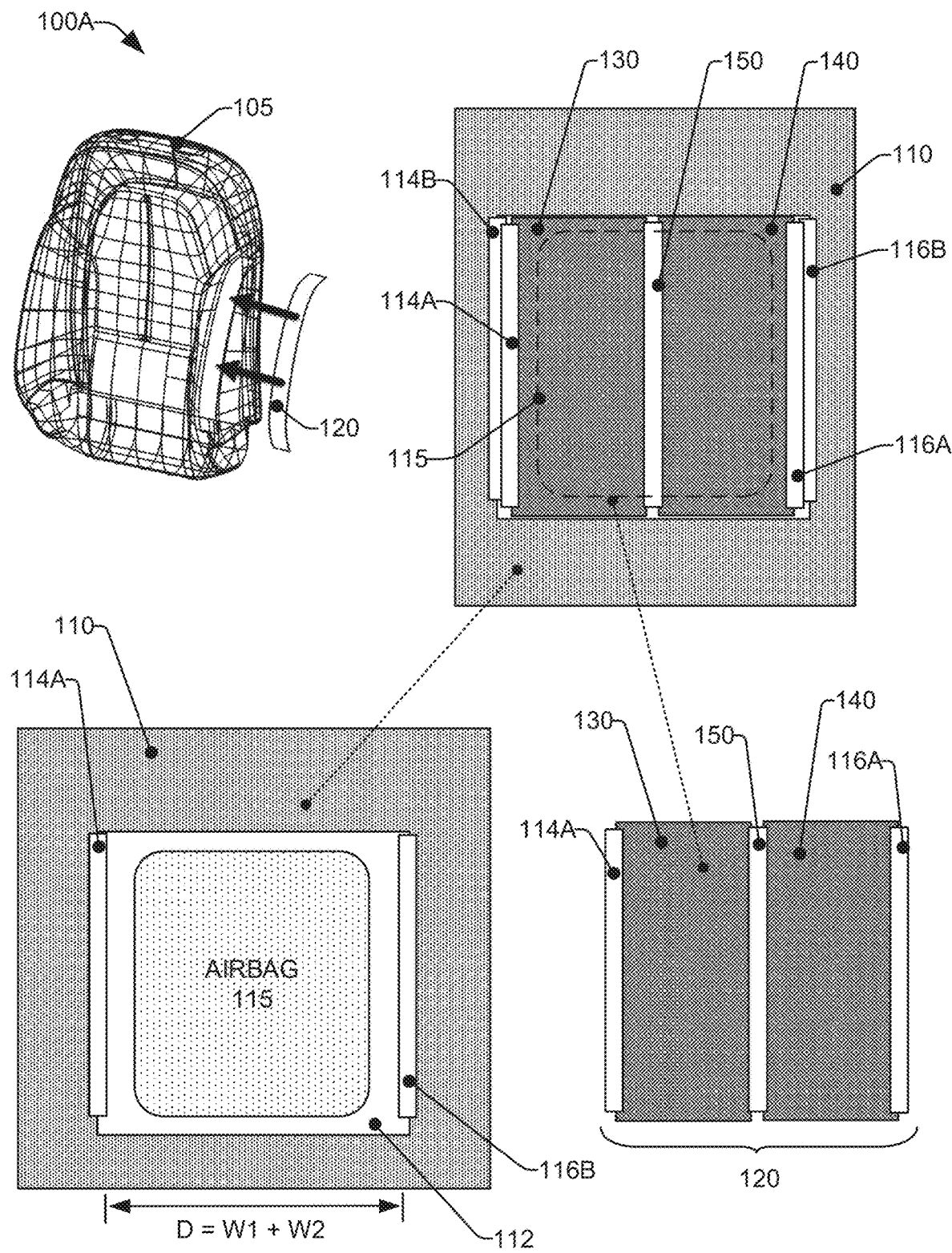
FIGS. 1A-1D present various illustrations of systems/configurations utilized during testing of an airbag incorporated into a seat, in accordance with an embodiment.
Figure 1B:
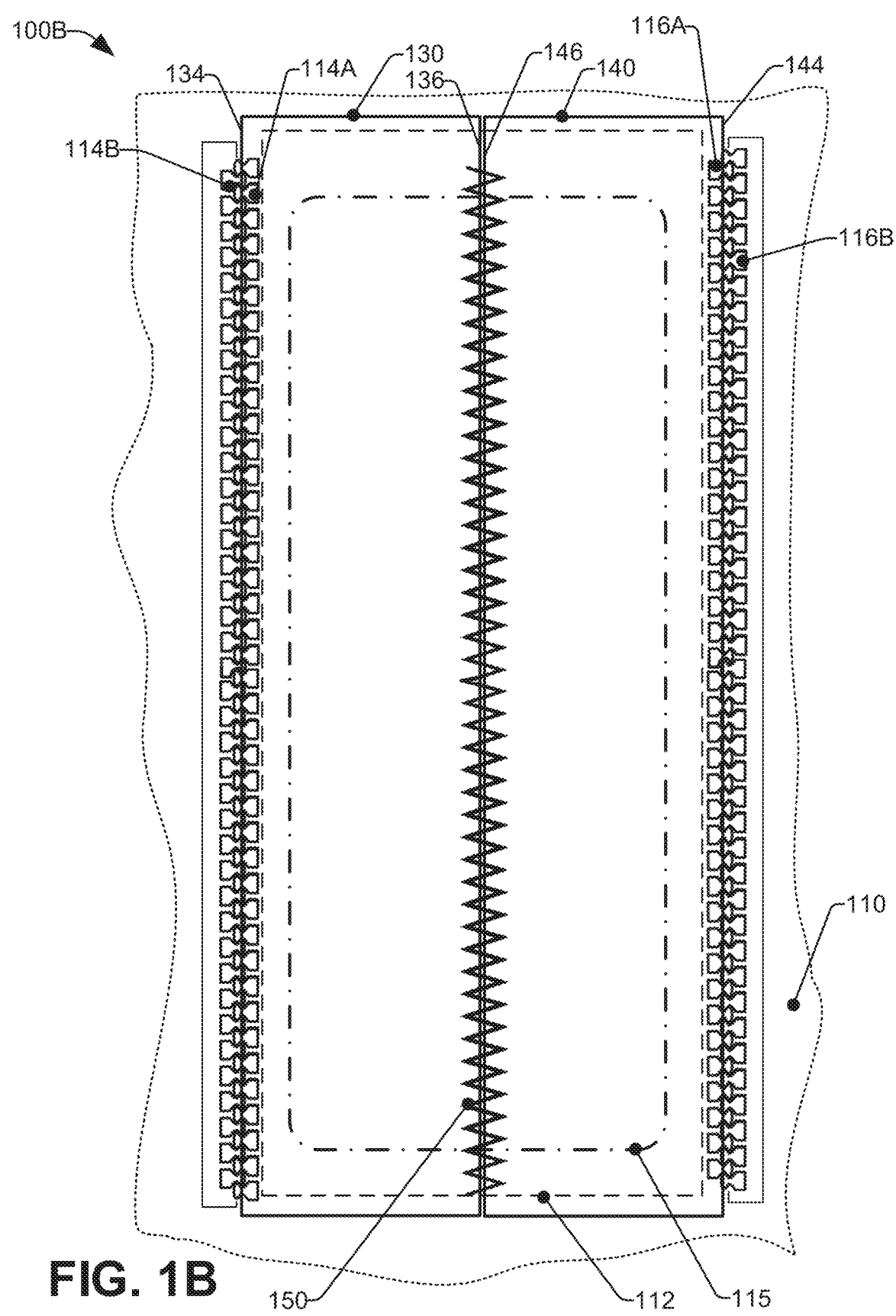
Figure 1C:
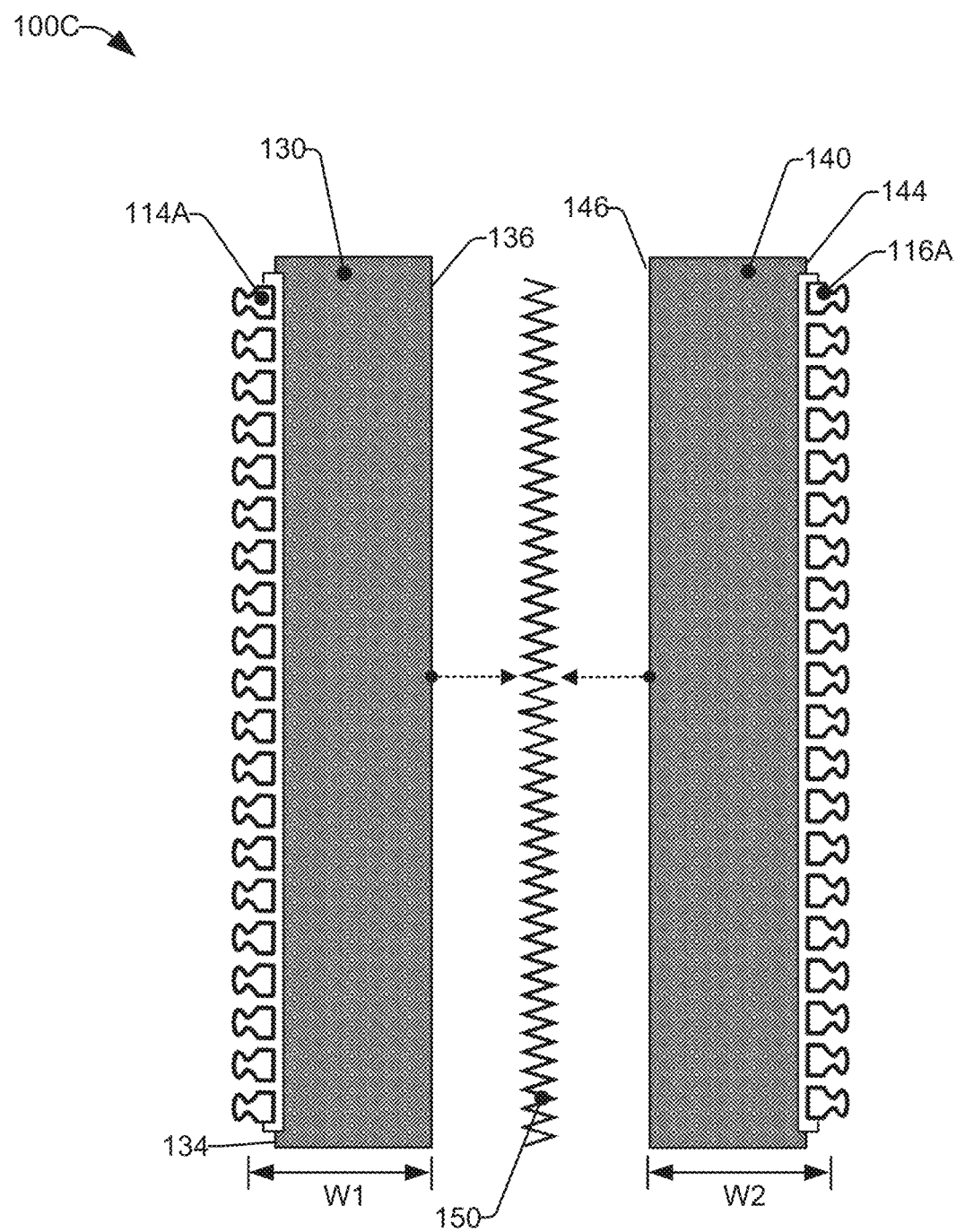

Turning to the figures, FIGS. 1A-ID present various illustrations of systems 100A-100D that can be utilized during testing of an airbag incorporated into a seat, in accordance with an embodiment.

As shown in FIGS. 1A-D, systems 100A-D, a detachable seat cover 120 is presented and configured to undergo failure upon deployment of an airbag incorporated into the seat, in accordance with an embodiment. The detachable seat cover comprises a first portion 130 (aka first segment) and a second portion 140 (aka second segment). In an embodiment, the first portion 130 and second portion 140 are presented as having a substantially rectangular shape, however, it is to be appreciated that any suitable shape can be utilized. For example, the detachable seat cover 120, and the respective first portion 130 and second portion 140, can be configured to map to contours of the underlying surface 110 of the seat 105 into which the airbag 115 is incorporated and the detachable seat cover 120 is to be applied.

First portion 130 includes a first edge 134 and a second edge 136, wherein the first edge 134 is located opposite to the second edge 136, with the first edge 134 and second edge 136 separated by a width W1 of the first portion 130. Located on the first edge 134 of the first portion 130 is a first portion 114A of a first attachment means 114 (wherein the first portion 114A and second portion 114B combine to form first attachment means 114).

Second portion 140 includes a first edge 144 and a second edge 146, wherein the first edge 144 of the second portion 140 is located opposite to the second edge 146 of the second portion 140, with the first edge 144 and second edge 146 separated by a width W2 of the second portion 140. Located on the first edge 144 of the second portion 140 is a first portion 116A of a second attachment means 116 (wherein the first portion 116A and second portion 116B combine to form first attachment means 116).

As further shown, a connection means 150 can be utilized to connect the first portion 130 to the second portion 140, such that the second edge 136 of the first portion 130 is located adjacent to the second edge 146 of the second portion 140. The connection means 150 is utilized to attach the first portion 130 to the second portion 140, wherein the connection means 150 can be a thread, a yarn, etc., configured to create a seam (e.g., a flat seam) between the second edge 136 of the first portion 130 and the second edge 146 of the second portion 140.

Further, to facilitate attachment of the detachable cover 120 to the seat, the second portion 114B of the first attachment means 114 is attached/connected to a surface 110 (e.g., an exterior surface) of the seat. Similarly, the second portion 116B of the second attachment means 116 is attached/connected to the surface 110. Second portion 114B and second portion 116B are positioned such that when attached, the detachable cover 120 is located/positioned over a hole/opening/cavity 112 in the seat in which the airbag 115 is located. Opening 112 can be configured to guide the airbag 115 during deployment to ensure the airbag 115 deploys in the correct direction/location. Detachable cover 120 can be located relative to hole 112 such that the connection means 150 is positioned substantially centrally over the hole 112 with the airbag 115 located underneath. In an embodiment, a distance D between the second portion 114B of the first attachment means 114 and the second portion 116B of the second attachment means 116 substantially equals width W1+width W2.

In an embodiment, the connection means 150 can be formed from any suitable material, such as, in a non-limiting list, a thread, a fiber, a yarn, or a filament, and the connection means 150 can comprise natural material or synthetic/manmade material. In a further embodiment, the connection means 150 is configured to fail preferentially over/prior to either of the first attachment means 114 or the second attachment means 116. Further, the connection means 150 is configured to fail preferentially over/prior to a permanent seam 106A-n incorporated into the seat 105. Accordingly, connection means 150 can have a failure strength less than the failure strength/mechanism of the attachment means 114 and 116, and of material forming the permanent seam xl In effect, the connection means 150 functions the same as/comparable to, a tear seam, e.g., tear seam 107 (per FIG. 6).

In a further embodiment, the first portion 130 and second portion 140 of the detachable cover 120 can be formed with any suitable material, etc., as used to fabricate/form the exterior surface 110 of seat 105. The first portion 130 and second portion 140 of the detachable cover 120 can be formed from, in a non-limiting list, a fabric, leather, artificial leather, a manmade material, a polymer, carbon fiber, a woven material, a textile, and suchlike. In an embodiment, with the detachable cover 120 located on the exterior surface 110 of seat 105, with the first portion 130 and second portion 140 of the detachable cover 120 being fabricated from the same material, etc., as the surface 110 material, the detachable cover 120 is aethestically comparable to the seat 105.

In another embodiment, the first attachment means 114 and/or the second attachment means 116 can comprise of any suitable/detachable fastener technology/material. For example, in a non-limiting list, the first attachment means 114 and/or the second attachment means 116 can comprise a zip/zipper (e.g., plastic or metal paired teeth strips respectively forming attachment means 114A/114B, 116A/116B with a movable sliding attaching/detaching the respective halves 114A/114B, 116A/116B), a VELCRO© strip (e.g., paired hook and eye strips respectively forming attachment means 114A/114B, 116A/116B), DUAL LOCK© (a pair of strips comprising interlocking mushroom-shaped heads), paired magnets (respectively forming attachment means 114A/114B, 116A/116B), at least one hook and eye (respectively forming attachment means 114A/114B, 116A/116B), at least one button and hole (e.g., a twist-lock button and eyelet respectively forming attachment means 114A/114B, 116A/116B), at least one magnet (e.g., paired magnets respectively forming attachment means 114A/114B, 116A/116B0), an adhesive having a requisite bond strength that respective portions 114A/114B and/or 116A/116B remain adhered while the connection means 150 undergoes rupture. The second portions 114B and 116B of the attachment means 114/116 can be securely attached to the exterior surface 110 of the seat 105. A combination of any of the foregoing can be utilized, such as buttons paired with a zipper such that, in an example embodiment, the buttons are positioned at either end of the zipped portion to prevent "peeling" around the zipper portion.

Figure 1D:
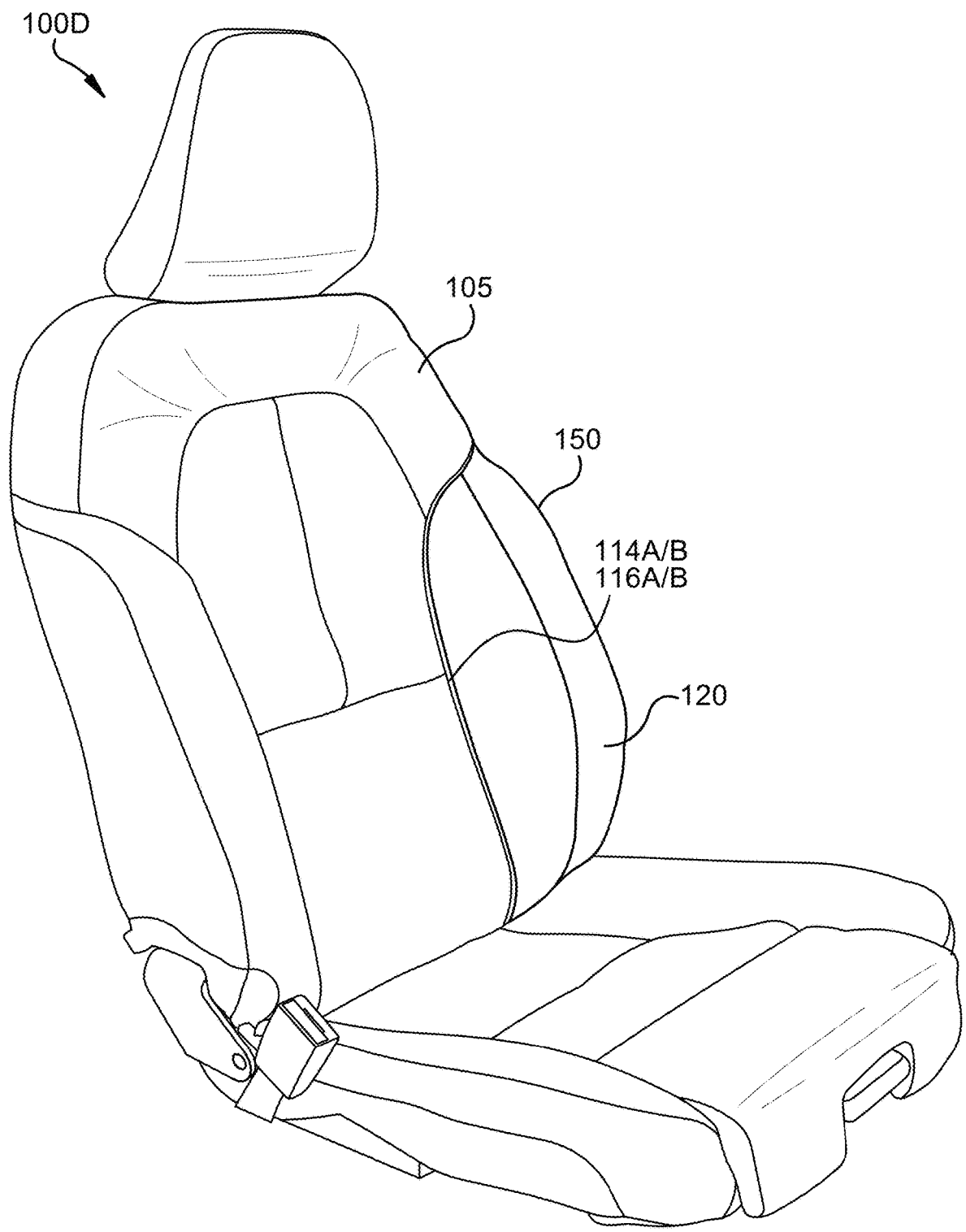

FIG. 1D, image 100D, illustrates a seat with the detachable seat cover in place, in accordance with an embodiment. As shown, a detachable seat cover 120 is attached to seat 105, with attachment by attachment means 114A/114B or 116A/116B, and the connection means 150 positioned for deployment of the underlying airbag 115 (e.g., in response to a side impact).

Figure 2:
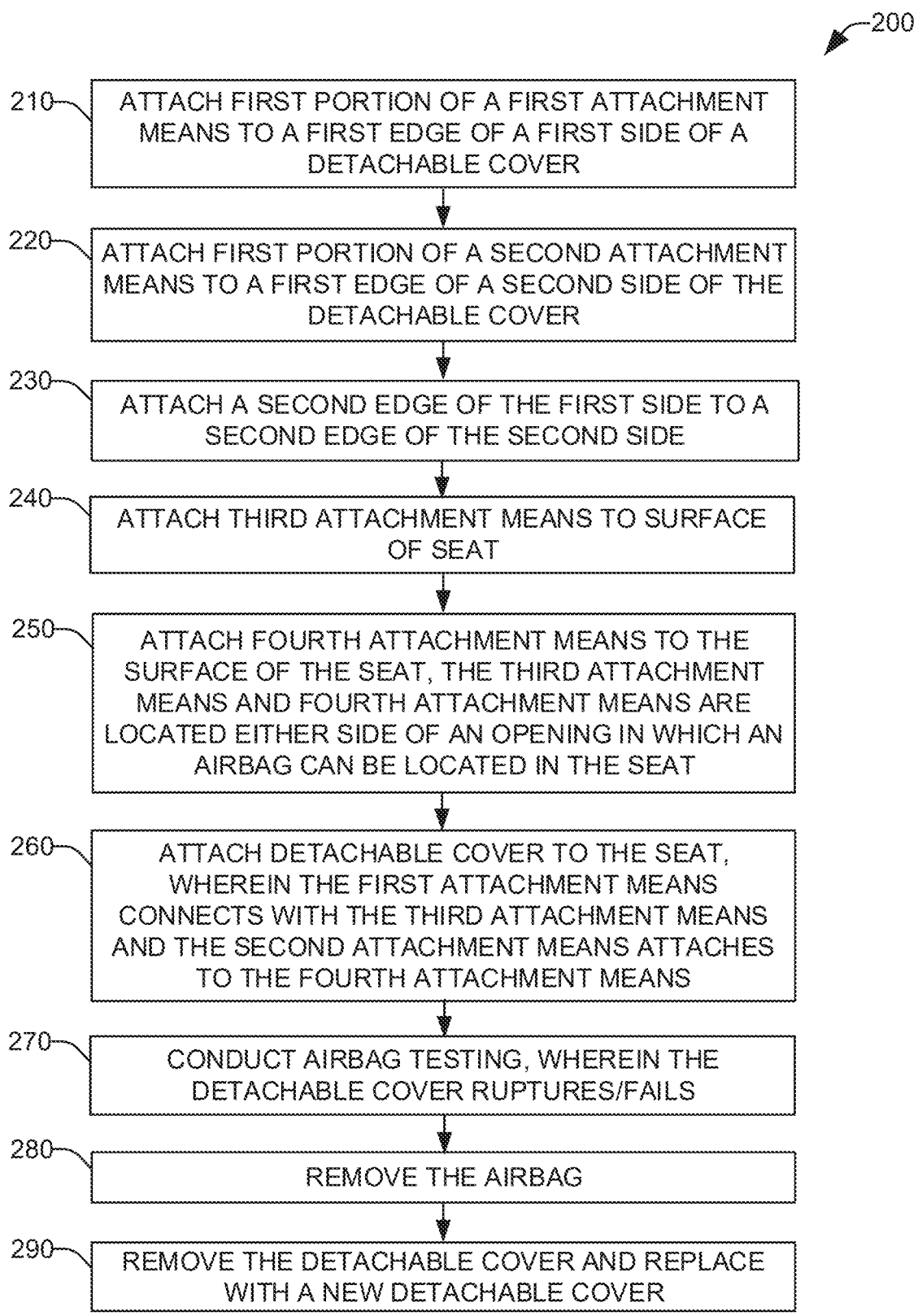
FIG. 2 illustrates a process for constructing and utilizing a detachable airbag cover, in accordance with one or more embodiments.

FIG. 2, via flowchart 200, illustrates a process for constructing and utilizing a detachable airbag cover, in accordance with one or more embodiments. As previously described, during deployment of an airbag, a seam in a seat can be configured to fail preferentially over other parts of the seat. In an aspect, once testing has been performed, the air bag and detachable cover can be replaced for subsequent testing, while the majority of the test seat can be reused.

At 210, a first side of a detachable cover (e.g., detachable cover 120) is formed, wherein a first attachment means (e.g., first portion 114A of first attachment means 114) is attached to a first edge (e.g., first edge 134) of a first segment/portion (e.g., first segment 130) of the detachable cover.

At 220, a second side of the detachable cover is formed, wherein a second attachment means (e.g., first portion 116A of second attachment means 116) is attached to a first edge (e.g., first edge 144) of a second segment/portion (e.g., second segment 140) of the detachable cover.

At 230, the first side of the detachable cover is connected to the second side of the detachable cover, whereby a second edge (e.g., second edge 136) of the first segment is positioned adjacent to a second edge (e.g., second edge 146) of the second segment. Further, a failure attachment (e.g., connection means 150) is utilized to connect the second edge of the first segment to the second edge of the second segment.

At 240, a third attachment means (e.g., second portion 114B of first attachment means 114) is located on an exterior surface (e.g., surface 110) of a seat structure (e.g., seat 105).

At 250, a fourth attachment means (e.g., second portion 116B of second attachment means 116) is located on the exterior surface (e.g., surface 110) of the seat structure (e.g., seat 105). The third attachment means and the fourth attachment means are positioned such that the detachable cover is located over an opening (opening 112) in the seat, whereby the opening facilitates location of an airbag (e.g., airbag 115).

At 260, the detachable cover is located on the seat, wherein the first portion of the first attachment means is connected to the second portion of the first attachment means, and the further, wherein the first portion of the second attachment means is connected to the second portion of the second attachment means. Accordingly, the first attachment means and second attachment means securely locate the detachable cover to the seat, with the failure means located over the opening.

At 270, testing is conducted, during which the airbag deploys, causing rupture of the failure attachment means, while the first attachment means and second attachment means securely retain location of the detachable cover (e.g., the first side of the detachable cover and the second side of the detachable cover respectively remain attached via the first attachment means and the second attachment means.

At 280, subsequent to testing, the deployed airbag can be removed and replaced.

At 290, the detachable cover can be removed and replaced, such that the first side of the detachable cover is removed from the first attachment means, the second side of the detachable cover is removed from the second attachment means, a new detachable cover is utilized for the subsequent testing or the first side of the detachable cover is connected to the second side of the detachable cover via a new failure attachment means and the detachable cover is relocated over the opening.

Figure 3:
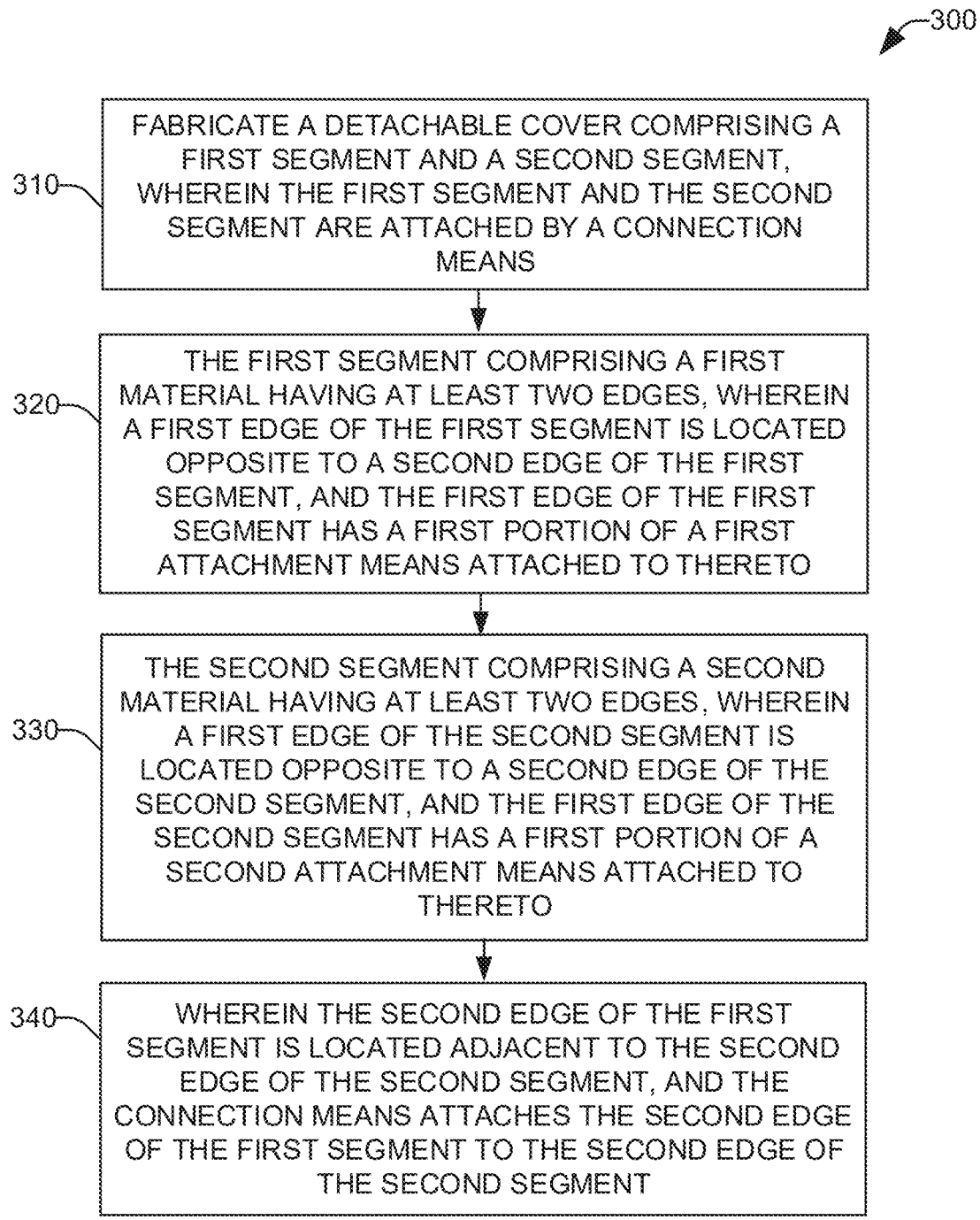
FIG. 3 illustrates a process for constructing and utilizing a detachable airbag cover, in accordance with one or more embodiments.

FIG. 3, via block flow diagram 300, illustrates a process associated with fabrication and implementation of a detachable cover (e.g., detachable cover 120). At 310, the detachable cover can comprise a first segment (e.g., first segment 130) and a second segment (e.g., second segment 140), wherein the first segment and the second segment are attached by a connection means (e.g., connection means 150). At 320, the first segment can comprise a first material having at least two edges, wherein a first edge (e.g., first edge 134) of the first segment is located opposite to a second edge (e.g., second edge 136) of the first segment, and the first edge of the first segment has a first portion (e.g., first portion 114A) of a first attachment means (e.g., attachment means 114) attached to thereto. At 330, the second segment can comprise a second material having at least two edges, wherein a first edge (e.g., first edge 144) of the second segment is located opposite to a second edge (e.g., second edge 146) of the second segment, and the first edge of the second segment has a first portion (e.g., attachment means 116A) of a second attachment means (e.g., attachment means 116) attached to thereto. At 340, wherein the second edge (e.g., second edge 136) of the first segment is located adjacent to the second edge (e.g., second edge 146) of the second segment, and the connection means attaches the second edge of the first segment to the second edge of the second segment.

Figure 4:
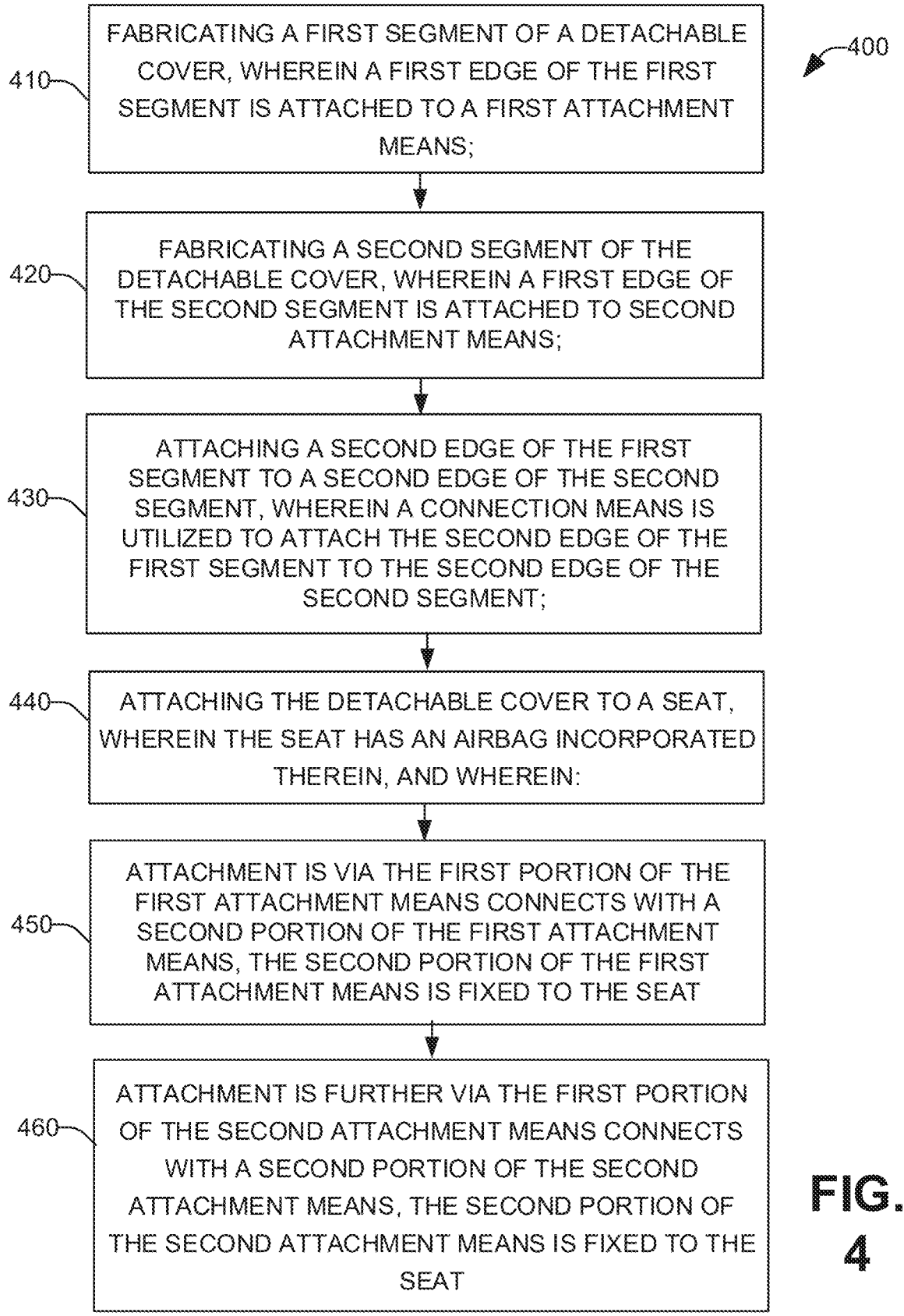
FIG. 4 illustrates a process for constructing and utilizing a detachable airbag cover, in accordance with one or more embodiments.

FIG. 4, via flowchart 400, illustrates a method for fabricating a detachable cover. At 410, the method 400 comprises fabricating a first segment of a detachable cover, wherein a first edge of the first segment is attached to a first attachment means. At 420, method 400 can further comprise fabricating a second segment of the detachable cover, wherein a first edge of the second segment is attached to second attachment means. At 430, method 400 can further comprise attaching a second edge of the first segment to a second edge of the second segment, wherein a connection means is utilized to attach the second edge of the first segment to the second edge of the second segment. At 440, method 400 can further comprise attaching the detachable cover to a seat, wherein the seat has an airbag incorporated therein. At 450, method 400 can further comprise, wherein attachment is via the first portion of the first attachment means connects with a second portion of the first attachment means, the second portion of the first attachment means is fixed to the seat. At 460, method 400 can further comprise, wherein attachment is further via the first portion of the second attachment means connects with a second portion of the second attachment means, the second portion of the second attachment means is fixed to the seat.

Figure 5:
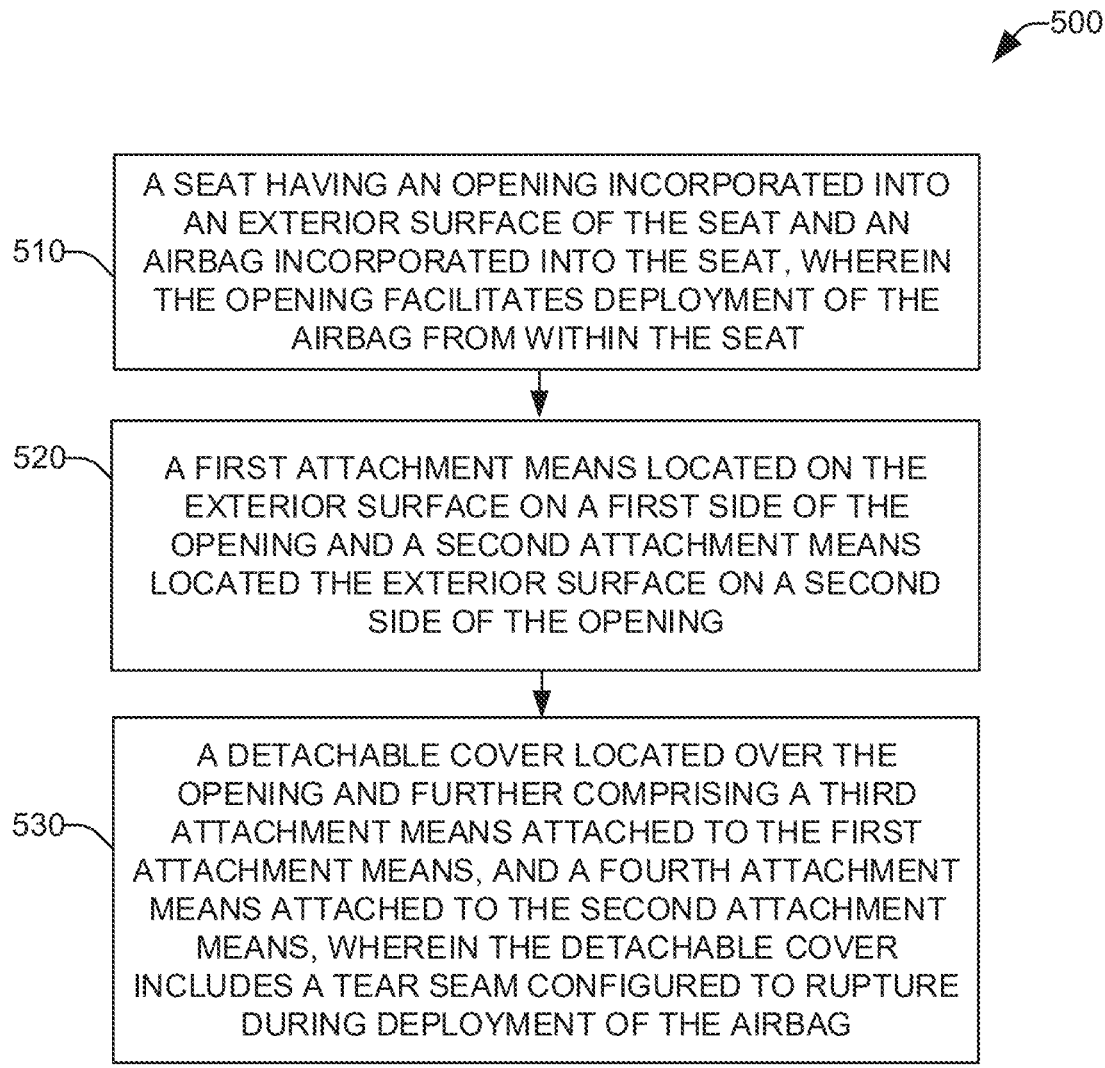
FIG. 5 illustrates a process for constructing and utilizing a detachable airbag cover, in accordance with one or more embodiments.

FIG. 5, via flow chart 500, illustrates fabrication and implementation of a detachable cover. At 510, system 500 can include a seat having an opening incorporated into an exterior surface of the seat and an airbag incorporated into the seat, wherein the opening facilitates operation (e.g., guided deployment) of the airbag within the seat. At 520, system 500 can further include a first attachment means located on the exterior surface on a first side of the opening and a second attachment means located the exterior surface on a second side of the opening. At 530, system 500 can further include a detachable cover located over the opening and further comprising a third attachment means attached to the first attachment means, and a fourth attachment means attached to the second attachment means, wherein the detachable cover includes a tear seam configured to rupture during deployment of the airbag.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Various non-limiting aspects of various embodiments described herein are presented in the following clauses.

Clause 1. A detachable cover, comprising: a first segment and a second segment, wherein the first segment and the second segment are attached by a connection means; the first segment comprising a first material having at least two edges, wherein a first edge of the first segment is located opposite to a second edge of the first segment, and the first edge of the first segment has a first portion of a first attachment means attached to thereto; the second segment comprising a second material having at least two edges, wherein a first edge of the second segment is located opposite to a second edge of the second segment, and the first edge of the second segment has a first portion of a second attachment means attached to thereto; and wherein the second edge of the first segment is located adjacent to the second edge of the second segment, and the connection means attaches the second edge of the first segment to the second edge of the second segment.

Clause 2. The detachable cover of any preceding clause, wherein the first material and the second material comprise at least one of a fabric, leather, artificial leather, a manmade material, a polymer, carbon fiber, a woven material, a textile.

Clause 3. The detachable cover of any preceding clause, wherein the first segment and second segment are substantially rectangular in shape.

Clause 4. The detachable cover of any preceding clause, wherein the detachable cover is configured to attach to a seat, and further cover an opening for an airbag incorporated into the seat.

Clause 5. The detachable cover of any preceding clause, wherein the connection means is configured to fail preferentially relative to the first attachment means the second attachment means.

Clause 6. The detachable cover of any preceding clause, wherein the connection means is configured to fail in response to pressure applied to the connection means during deployment of the airbag.

Clause 7. The detachable cover of any preceding clause, wherein the connection means fails at a pressure equal to, or less than, the pressure applied by the airbag.

Clause 8. The detachable cover of any preceding clause, wherein the first attachment means and the second attachment means comprise one of a zipper, VELCRO©, hook and loop, at least one hook, a cable tie, a zip tie, at least one button, at least one magnet, an adhesive, or a combination thereof.

Clause 9. The detachable cover of any preceding clause, wherein the first portion of the first attachment means attaches the detachable cover to a second portion of the first attachment means, the second portion of the first attachment means is located on a seat, and the first portion of the second attachment means attaches the detachable cover to a second portion of the second attachment means, the second portion of the first attachment means is located on the seat.

Clause 10. The detachable cover of any preceding clause, wherein a distance between the second portion of the first attachment means and the second portion of the second attachment means is substantially equal to a first width between the first edge of the first segment and the second edge of the first segment and a second width between the first edge of the second segment and the second edge of the second segment.

Clause 11. The detachable cover of any preceding clause, wherein the connection means is one of a thread, a fiber, a yarn, or a filament, and the connection means comprises natural or synthetic material.

Clause 12. The detachable cover of any preceding clause, wherein application of the connection means forms a flat seam adjoining the first edge of the first segment to the first edge of the second segment.

Clause 13. A method, comprising fabricating a first segment of a detachable cover, wherein a first edge of the first segment is attached to a first attachment means; fabricating a second segment of the detachable cover, wherein a first edge of the second segment is attached to second attachment means; attaching a second edge of the first segment to a second edge of the second segment, wherein a connection means is utilized to attach the second edge of the first segment to the second edge of the second segment; and attaching the detachable cover to a seat, wherein the seat has an airbag incorporated therein, and wherein: attachment is via the first portion of the first attachment means connects with a second portion of the first attachment means, the second portion of the first attachment means is fixed to the seat; and attachment is further via the first portion of the second attachment means connects with a second portion of the second attachment means, the second portion of the second attachment means is fixed to the seat.

Clause 14. The method of any preceding clause, wherein the second portion of the first attachment means and the second portion of the second attachment means are located about an opening in the seat, the airbag is located in the opening, and deployment of the airbag causes breakage of the connection means connecting the first segment to the second segment.

Clause 15. The method of any preceding clause, wherein at least one of the first attachment means or the second attachment means comprises one of a zip, a zipper, a VELCRO© strip, a hook and loop strip, a DUAL LOCK© strip, paired magnets, at least one hook and eye, at least one button and hole, an adhesive strip, a cable tie, a zip tie, a means for attaching two surfaces together, or combination thereof.

Clause 16. The method of any preceding clause, wherein the connection means comprises a thread, a fiber, a yarn, a filament, naturally occurring-material, or synthetic material, and the connection means is configured to fail during deployment of the airbag.

Clause 17. A system, comprising: a seat having an opening incorporated into an exterior surface of the seat and an airbag incorporated into the seat, wherein the opening facilitates deployment of the airbag from within the seat; a first attachment means located on the exterior surface on a first side of the opening and a second attachment means located the exterior surface on a second side of the opening; and a detachable cover located over the opening and further comprising a third attachment means attached to the first attachment means, and a fourth attachment means attached to the second attachment means, wherein the detachable cover includes a tear seam configured to rupture during deployment of the airbag.

Clause 18. The system of any preceding clause, wherein the tear seam is formed with a connection means, the connection means comprising one of a thread, a fiber, a yarn, a filament, naturally occurring-material, or synthetic material, and the connection means is configured to fail during deployment of the airbag.

Clause 19. The system of any preceding clause, wherein the first attachment means, the second attachment means, the third attachment means, or the fourth attachment means comprise one of a zip, a zipper, a VELCRO® strip, a hook and loop strip, a DUAL LOCK® strip, paired magnets, at least one hook and eye, at least one button and hole, a cable tie, a zip tie, an adhesive strip, a means for attaching two surfaces together, or combination thereof Clause 20, The system of any preceding clause, wherein the detachable cover further comprises a first segment of material attached to the first attachment means and the tear seam and a second segment of material attached to the second attachment means and the tear seam.

In various cases, any suitable combination of clauses 1-12 can be implemented.

In various cases, any suitable combination of clauses 13-16 can be implemented.

In various cases, any suitable combination of clauses 17-20 can be implemented.

What is claimed is:

1. A detachable cover, comprising:
   a first segment and a second segment, wherein the first segment and the second segment are attached by a connection means;
   the first segment comprising a first material having at least two edges, wherein a first edge of the first segment is located opposite to a second edge of the first segment, and the first edge of the first segment has a first portion of a first attachment means attached to thereto;
   the second segment comprising a second material having at least two edges, wherein a first edge of the second segment is located opposite to a second edge of the second segment, and the first edge of the second segment has a first portion of a second attachment means attached to thereto; and
   wherein the second edge of the first segment is located adjacent to the second edge of the second segment, and the connection means attaches the second edge of the first segment to the second edge of the second segment.

2. The detachable cover of claim 1, wherein the first material and the second material comprise at least one of a fabric, leather, artificial leather, a manmade material, a polymer, carbon fiber, a woven material, a textile.

3. The detachable cover of claim 1, wherein the first segment and the second segment are substantially rectangular in shape.

4. The detachable cover of claim 1, wherein the detachable cover is configured to attach to a seat, and further cover an opening for an airbag incorporated into the seat.

5. The detachable cover of claim 4, wherein the connection means is configured to fail preferentially relative to the first attachment means and the second attachment means.

6. The detachable cover of claim 5, wherein the connection means is configured to fail in response to pressure applied to the connection means during deployment of the airbag.

7. The detachable cover of claim 5, wherein the connection means fails at a pressure equal to, or less than, the pressure applied by the airbag.

8. The detachable cover of claim 1, wherein the first attachment means and the second attachment means comprise one of a zipper, hook and loop, at least one hook, a cable tie, a zip tie, at least one button, at least one magnet, an adhesive, or a combination thereof.

9. The detachable cover of claim 1, wherein the first portion of the first attachment means attaches the detachable cover to a second portion of the first attachment means, the second portion of the first attachment means is located on a seat, and the first portion of the second attachment means attaches the detachable cover to a second portion of the second attachment means, the second portion of the first attachment means is located on the seat.

10. The detachable cover of claim 9, wherein a distance between the second portion of the first attachment means and the second portion of the second attachment means is substantially equal to a first width between the first edge of the first segment and the second edge of the first segment and a second width between the first edge of the second segment and the second edge of the second segment.

11. The detachable cover of claim 1, wherein the connection means is one of a thread, a fiber, a yarn, or a filament, and the connection means comprises natural or synthetic material.

12. The detachable cover of claim 11, wherein application of the connection means forms a flat seam adjoining the first edge of the first segment to the first edge of the second segment.

13. A method, comprising:
   fabricating a first segment of a detachable cover, wherein a first edge of the first segment is attached to a first attachment means;
   fabricating a second segment of the detachable cover, wherein a first edge of the second segment is attached to second attachment means;
   attaching a second edge of the first segment to a second edge of the second segment, wherein a connection means is utilized to attach the second edge of the first segment to the second edge of the second segment; and
   attaching the detachable cover to a seat, wherein the seat has an airbag incorporated therein, and wherein:
      attachment is via the first portion of the first attachment means connects with a second portion of the first attachment means, the second portion of the first attachment means is fixed to the seat; and
      attachment is further via the first portion of the second attachment means connects with a second portion of the second attachment means, the second portion of the second attachment means is fixed to the seat.

14. The method of claim 13, wherein:
   the second portion of the first attachment means and the second portion of the second attachment means are located about an opening in the seat, the airbag is located in the opening, and deployment of the airbag causes breakage of the connection means connecting the first segment to the second segment.

15. The method of claim 13, wherein at least one of the first attachment means or the second attachment means comprises one of a zip, a zipper, a hook and loop strip, an interlocking mushroom-shaped heads strip, paired magnets, at least one hook and eye, at least one button and hole, an adhesive strip, a cable tie, a zip tie, a means for attaching two surfaces together, or combination thereof.

16. The method of claim 13, wherein the connection means comprises a thread, a fiber, a yarn, a filament, naturally occurring-material, or synthetic material, and the connection means is configured to fail during deployment of the airbag.

17. A system, comprising:
   a seat having an opening incorporated into an exterior surface of the seat and an airbag incorporated into the seat, wherein the opening facilitates deployment of the airbag from within the seat;
   a first attachment means located on the exterior surface on a first side of the opening and a second attachment means located the exterior surface on a second side of the opening; and
   a detachable cover located over the opening and further comprising a third attachment means attached to the first attachment means, and a fourth attachment means attached to the second attachment means, wherein the detachable cover includes a tear seam configured to rupture during deployment of the airbag.

18. The system of claim 17, wherein the tear seam is formed with a connection means, the connection means comprising one of a thread, a fiber, a yarn, a filament, naturally occurring-material, or synthetic material, and the connection means is configured to fail during the deployment of the airbag.

19. The system of claim 17, wherein the first attachment means, the second attachment means, the third attachment means, or the fourth attachment means comprise one of a zip, a zipper, a hook and loop strip, an interlocking mushroom-shaped heads strip, paired magnets, at least one hook and eye, at least one button and hole, a cable tie, a zip tie, an adhesive strip, a means for attaching two surfaces together, or combination thereof.

20. The system of claim 17, wherein the detachable cover further comprises a first segment of material attached to the first attachment means and the tear seam and a second segment of material attached to the second attachment means and the tear seam.

\* \* \* \* \*